United States Patent [19]
Paniagua

[11] 3,826,035

[45] July 30, 1974

[54] METHOD OF EXTERMINATING INSECT AND ANIMAL AGRICULTURAL PESTS FROM INFECTED OBJECTS SUCH AS PLANTS

[76] Inventor: Juan Garcia Paniagua, Alejandria 1609, Colony Residencial Victoria, Guadalajara 5, Jal, Mexico

[22] Filed: Sept. 13, 1972

[21] Appl. No.: 288,885

[52] U.S. Cl. .................................... 43/98, 47/1.3
[51] Int. Cl. ..................... A01m 7/00, A01m 19/00
[58] Field of Search .......... 43/98, 112, 17.1; 47/1.3

[56] References Cited
UNITED STATES PATENTS

| | | | |
|---|---|---|---|
| 779,791 | 1/1905 | Lokuciejewsky | 43/98 X |
| 1,737,866 | 12/1929 | Roe | 43/112 X |
| 2,302,185 | 11/1942 | Campbell, Jr. | 47/1.3 UX |
| 2,591,597 | 4/1952 | Opp et al. | 47/1.3 |
| 2,596,504 | 5/1952 | Opp | 47/1.3 |
| 3,120,722 | 2/1964 | Keller | 47/1.3 |
| 3,258,872 | 7/1966 | Senkewich | 43/112 X |
| 3,363,356 | 1/1968 | Kreutzer | 43/17.1 |

Primary Examiner—James H. Czerwonky
Attorney, Agent, or Firm—Holman & Stern

[57] ABSTRACT

A novel method of exterminating insect and animal agricultural pests from infected objects such as plants is disclosed. In the preferred inventive embodiment, and as applied to exterminating pests from plants such as trees, the root of the tree is electrically grounded by burying a rod or plate of good conductive material adjacent thereto, the rod or plate being coupled to the negative pole of an electric power source. The positive pole is connected to a pipe of good electrically conductive material that is installed in the interior of the outlet of a hose which is coupled to a pneumatic water pressure system. The continuous flow of water contacts the positive pole and touches the branches, leaves and trunk which have been made previously wet in order to form a good negative circuit, and an electric discharge takes place through the water and surface of the tree to thereby eliminate pests within the tree while not damaging the tree.

7 Claims, 6 Drawing Figures

3,826,035

METHOD OF EXTERMINATING INSECT AND ANIMAL AGRICULTURAL PESTS FROM INFECTED OBJECTS SUCH AS PLANTS

BACKGROUND OF THE INVENTION

This invention generally relates to extermination methods and techniques, and particularly concerns a novel method utilizing the application of an electrical discharge to exterminate insect and animal agricultural pests from infected objects such as plants.

Insect and animal agricultural pests have long been controlled by fumigation methods utilizing chemical products which serve to increase contamination and pollution of the environment thus endangering human life or, at the very least, adversely affecting enjoyment of the environment. Apart from such chemical techniques with the resultant disadvantages thereof, very few advances have been made in the prior art relative to agricultural pest control.

SUMMARY OF THE INVENTION

It is thus apparent that a need exists in the art for a new technique by which extermination, prevention, or even capture of such agricultural pests as insects, worms, birds, rats, and the like, can be effected without resulting harm to the environment. It is the primary objective of the instant invention to provide such an improved extermination technique.

It is a further objective of the instant invention to provide an improved technique to prevent, drive away, or exterminate such pests, which technique is far more economical than previous chemical approaches and results in an argricultural product of superior quality.

A further objective of the instant invention is the provision of an extermination technique which can be continuously effected so as to prevent such pests from depositing eggs in branches, leaves, roots, and the like, of fruit trees or crops.

Still another objective of the instant invention is the provision of a novel extermination technique to eliminate pests from crops and trees whereby contaimination thereof by insects and microbes is avoided, thereby obtaining a sterilized agricultural product.

Yet another objective of the instant invention is the provision of what is broadly termed a novel extermination technique which can be utilized to merely stun and therefore capture alive such pests for subsequent biological study thereof.

Yet another objective of the instant invention concerns the provision of a novel extermination technique applicable to eliminate pests from land, as well as water.

There objects, as well as others which will become apparent as the description proceeds, are implemented by the novel extermination technique which, as opposed to chemical fumigation action, contemplates the utilization of a controlled electrical discharge to effect the prevention, capture, driving away, and/or extermination of such insect and animal pests as described. In this respect, the novel method of exterminating contemplates, in its broadest sense, the provision of a source of electricity having both positive and negative poles with an electrical circuit being completed between the poles by a stream of continous flow of water which serves to make contact with the pest to be eliminated, thereby effecting an electrical discharge through the pests. The invention contemplates to control the mature of the electrical discharge by controlling the wave form characteristics thereof, thus, in a sense, "matching" the discharge to the type of pests to be eliminated.

In this respect, this provision of the source of electricity as well as the control of the particular characteristics thereof, it contemplated to be readily effected using a combination of known electrical machinery, appliances, and accessories, such as standard normal and high voltage plugs, full wave rectifiers, alternating and direct current generators, motors, transformers, coils, and batteries whereby the voltage, amperage, power, frequency, magnetic characteristics and the like of the electrical discharge may be changed at will so as to compensate for different types, sizes, classes and the like of trees or plants or the like to be protected from animal and insect pests of any type, class, and size that are to be captured or destroyed.

In one preferred embodiment of the instant invention, the novel exterminating method is utilized to eliminate animal and insect pests from an object such as a tree whereby the negative pole of the electric source is coupled to the roots of the tree such as through a rod or plate buried adjacent thereto. The positive pole of the electric source is coupled to pipe of good electric conductor material installed into the exit or outlet of a hose connected to a pneumatic water pressure system, such as an ordinary garden hose with electric insulation using a continuous flow of water so as to make electrical contact with the water flowing therethrough. The water is then irrigated with a continuous flow over the infected tree which results in a discharge of electricity from one pole of the electric source, through the water and the tree, to the grounded rod coupled to the other pole negative of the electric source that constitutes the only negative circuit with the trunk, branches and leaves of the tree, such discharge driving away, stunning, or eliminating the undesirable pest. Modifications to this general technique are contemplated whereby we can use one or more continuous flows of water connected to the negative polarity in combination with one or more continuous flows of water connected to the positive polarity, separating them when they are applied to the tree to produce an electric discharge in all its parts, knowing that both types (negative and positive) flow of water have a general movement.

In another preferred embodiment of the instant invention, the exterminating technique is contemplated to be utilized in combination with a standard pipe agricultural irrigation system with their correct electric insulation, wherein the continuous flow of water is electrically coupled to the positive and the other continuous flow of water is electrically coupled to the negative pole of the same source working in a similiar way to that described before.

In still a further embodiment of the instant invention, the extermination produce is contemplated to be modified so as to be effective in water, whereby the two poles of the electric power source are disposed in two different separate plates, one positive and the other negative, in water such as a lake, river, or sea to effect an electrical discharge therebetween, thereby capturing, paralyzing, or exterminating different type of fish, and other undesirable animals or insects that develop themselves in water, like snakes or mosquitos that are the transmitters of many diseases of people and cattle.

As an aid to understanding the basic principles of the instant invention, particularly as applied to the extermination of pests from an infected object such as a tree, it should be appreciated that if a person with a water hose in his hands is irrigating his garden and the pressure of the continuous flow of water touches the power line, an electric discharge will be produced which will continue throughout and follow the flow of water, and particularly will follow into the interior of the hose to affect the preson holding the hose standing on wet ground. The continuous flow of water completes a path from the high voltage line between the two poles, positive and negative, and the person would suffer the same deleterious effects as will all animals or insects in contact with the water flow between the negative and positive poles. However, the trees and plants would be protected from the deleterious electrical discharge because these objects are in good contact with the negative pole or ground by virtue of their root systems which would discharge the electric current directly into the ground. And the electric current discharges to ground through the water because it is a better electric conductor than any part of the tree, such as the leaves, branches and trunk.

The invention will be better understood and further features and advantages thereof other than those discussed above will become apparent from the following detailed description of the preferred inventive embodiments, such description making reference to the appended sheets of drawing, wherein.

DETAILED DESCRIPTION OF A PREFERRED INVENTIVE EMBODIMENT

Figure 1:
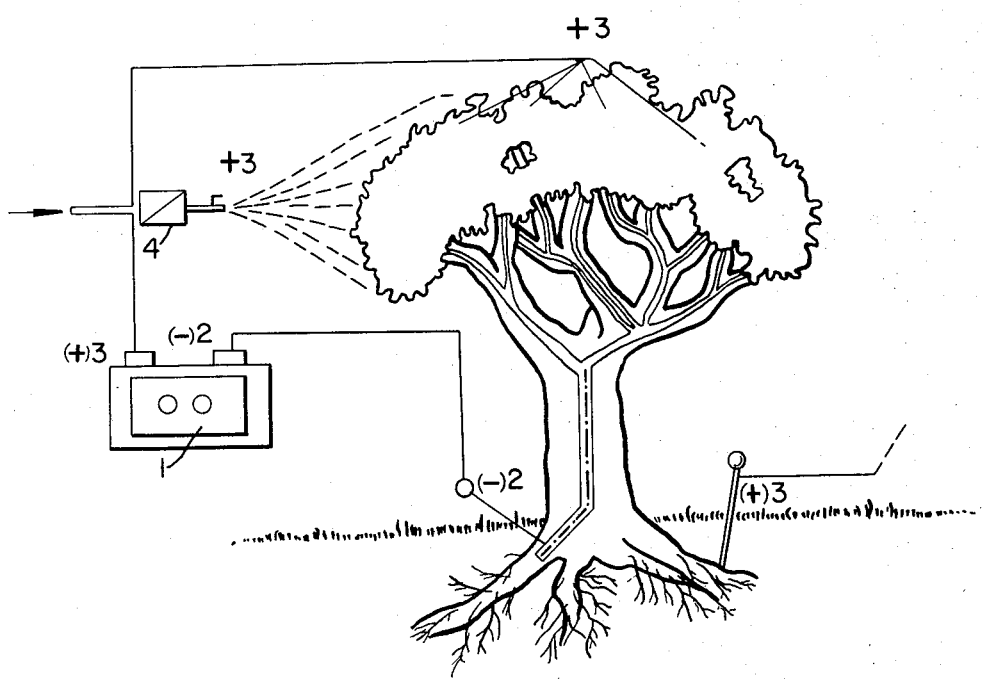
FIG. 1 is a perspective illustration of the application of the novel exterminating method of the instant invention to an infected tree.

Referring now to the drawings, and particularly to FIG. 1 thereof, it is to be assumed that the tree depicted therein having roots, a trunk, and leaves is infested with pests, particularly at or near the roots thereof. A source of electric energy or power designated by reference numeral 1 has a negative pole 2 coupled near the root of the tree by means of connection to a rod of good conductive material. Another rod may be introduced into the earth at the opposite side of the roots of the tree, this other rod being connected, when the root of tree is sick to the positive terminal 3 of the power source 1. The surface around the root of tree is irrigated until it is completely wet. Then the circuit is closed by a continuous flow of water which makes contact with positive terminal 3 through a water connection means 4.

We can use two different continuous flows of water, one connected to negative pole and the other to the positive pole, for completing the electric circuit on the tree, through the tree and the pests, thereby exterminating same. Of course, as should be appreciated, the particular connection of the positive and negative poles can be reversed with equally effective results.

Additional products such as diluted ammonia sulfate can be applied to the liquid in the embodiment of FIG. 1 as well as in the other embodiments to be described hereinbelow so as to make the water more conductive to electricity. Additionally, it can be appreciated by those skilled in the art that additional electrical conductors can be installed in the branches, trunk, leaves and roots of the trees so as to form a better electrical negative circuit and specifically so as to couple the sap or nutrient fluid of the tree to the negative circuit. This particular modification of the instant invention further provides an advantage in that the flow of electric current through the sap or nutrient fluid of the tree gives rise to the generation of heat to the tree whereby freezing in the winter can be avoided.

Figure 2:
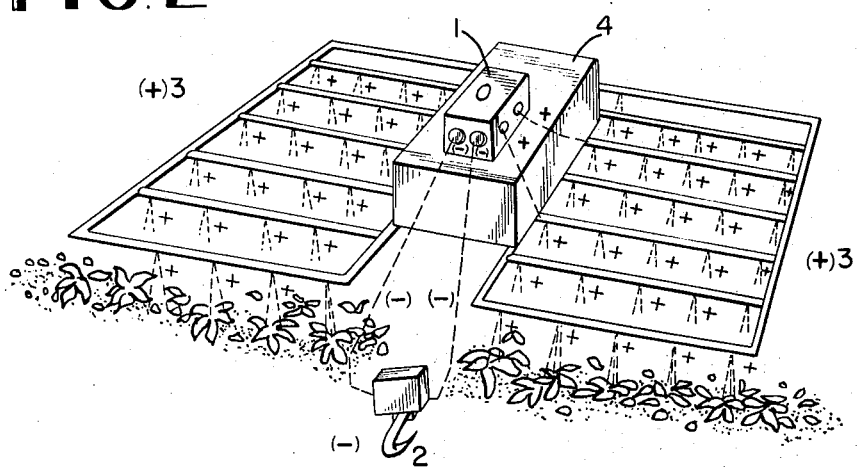
FIG. 2 is a perspective illustration of the application of the novel exterminating method of the instant invention to an irrigation system.

Referring now to FIG. 2, a mobile tractor is illustrated, provided with the same source of electrical power or energy 1, this embodiment of the invention functioning in much the same manner as above discussed. The negative pole 2 of the power source 1 is connected into the ground by any suitable mechanism as illustrated, whereas the positive pole 3 of the electric energy is coupled through a water connection means 4 so as to make contact with a source of continous water flow which is irrigated over an underlying crop effecting a discharge therethrough thereby eliminating pests from the crop. Different polarities in different consecutive lines of continuous water flows can be used.

Figure 3:
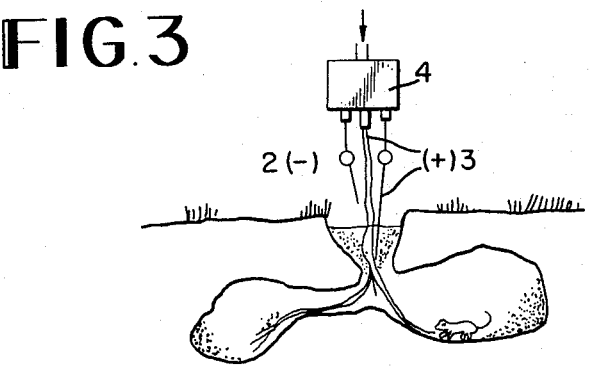
FIG. 3 is an illustration of the application of the novel exterminating method particularly effective in eliminating pests from underground burrows.

The embodiment of the invention depicted in FIG. 3 operates in a similar manner, in that the power source 1 is coupled through a connection means 4 so as to make electrical contact at one or the other of the terminals 2 and 3 with a continuous flow of water, the water flowing into an underground burrow and serving to effect an electrical discharge through pests found therein, such as through the illustrated nest of rats or ants, or the like.

Figure 4:
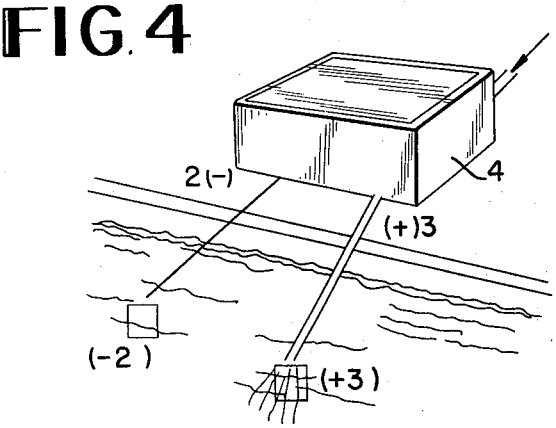
FIG. 4 is an illustration of the method of the instant invention applied under water to eliminate pests found therein.

With specific reference to FIG. 4, a source of water such as a lake, river, or sea is illustrated and the application of the novel exterminating technique thereto will be described. Specifically, the positive and negative terminals 2 and 3 of an electric power source 1 are disposed in different separated plates under water, thereby effecting a discharge of electricity between the two terminals through the water so as to capture, paralyze, or exterminate fish or undersirable animals or insects, like mosquitos.

Figure 5:
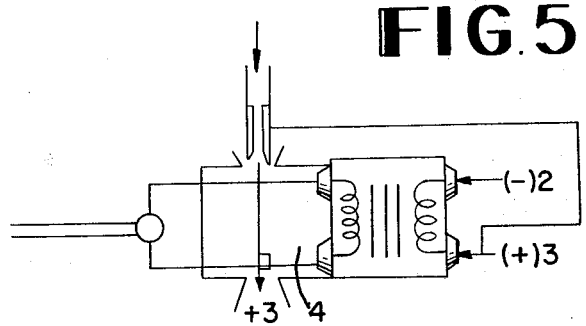
FIG. 5 is an electrical schematic diagram of apparatus effecting connection of a continuous flow of water, such as in a garden hose, with electric insulation, to at least one terminal of an electric power supply.

An example of a connection means 4 is shown in FIG. 5. A pipe of good electrical conductive material is disposed in the interior of a hose such as a garden hose with electrical insulation disposed in the interior of a hose, such as a garden hose. This pipe is connected to the positive pole of the source of energy to make good electrical connection with the continuous flow of water therethrough. Of course, the hose must be provided with sufficient electrical insulation so as to not endanger the user holding the hose.

Figure 6:
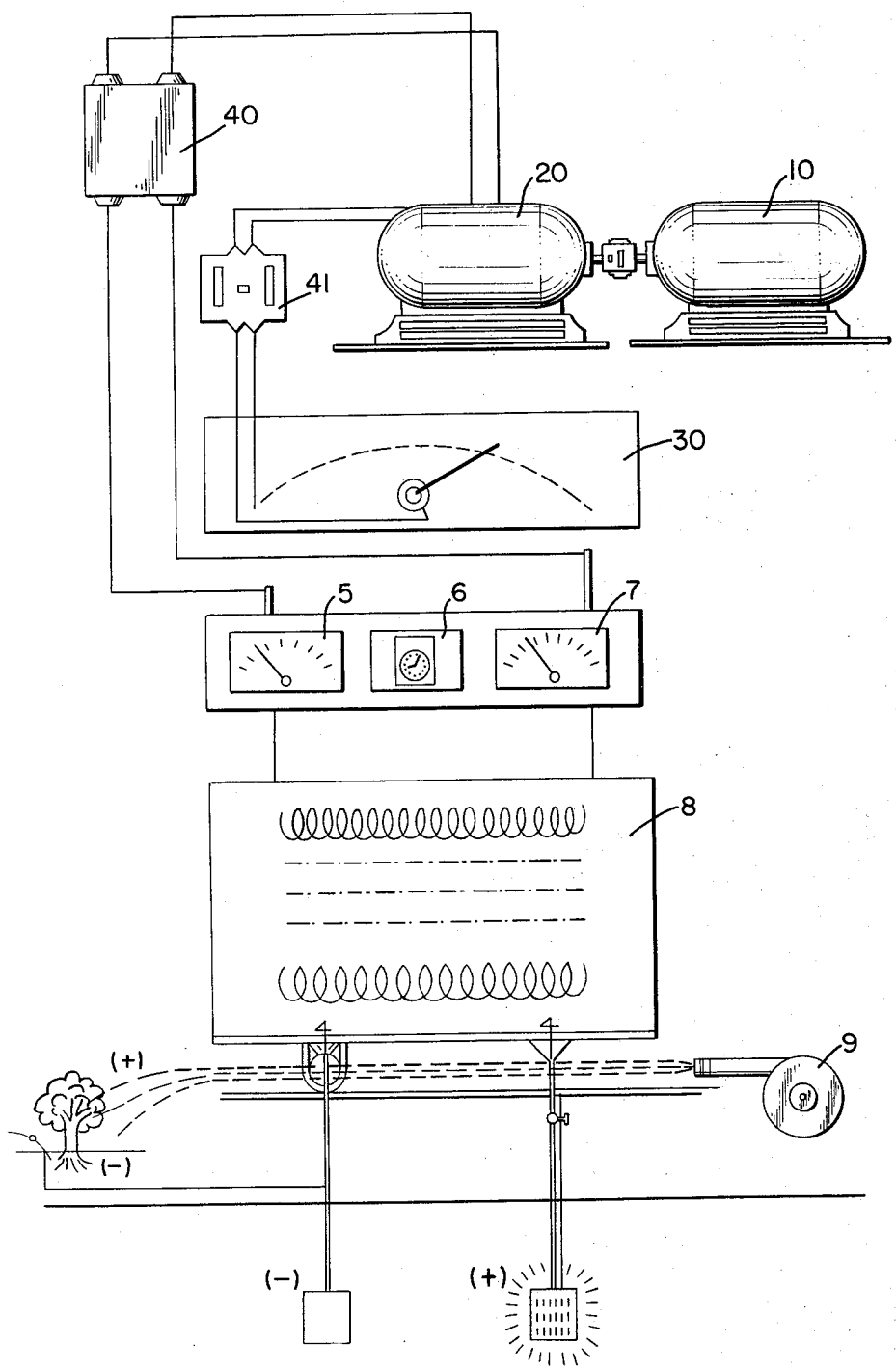
FIG. 6 is a schematic block diagram depicting the interconnection of various electrical mechanisms whereby the voltage, amperage, power, frequency, magnetic characteristics and the like of the electrical discharge can be varied at will, using alternating or continuous electric current.

Referring now to FIG. 6 the combination of known electrical equipment by which variations of the electrical characteristics of the discharge can be effected is shown. In this respect, the source of electric power could comprise an ordinary standard or high voltage electric plug coupled to common distribution lines. In this event, a full wave rectifier may be used to obtain direct electric current. Or alternating electric current could be used with suitable and sufficient voltage and control means.

In the event that common or commercial powerlines are not available, batteries or generators of electrical current can be utilized to supply the source of power, in which event proper rectifiers, switches, and the like can be provided.

In the embodiment wherein the electrical current must be produced which is the embodiment specifically contemplated by FIG. 6, the source of electrical energy 10 could comprise a motor of any suitable type serving to drive either an alternating or direct current generator 20 so as to provide different types of electrical outputs, and along with pneumatic water pressure system, all equipment could be installed on a truck.

In the instance wherein a direct current generator is used, a rheostat or other similar voltage control 30 is contemplated to be provided so as to regulate the output voltage of the generator fed through a circuit breaker 41. In the event wherein alternating current generators are provided, a full wave rectifier 40 would be used along with a suitable voltage measuring mechanism 5, frequency measurer 6, and amperage measurer 7, and other necessary measurement equipment with manual or automatical control. The equipment shown is only illustrative and others can be used to provide control over the electrical output.

A transformer 8 is also contemplated to be provided for transforming the alternating current, the transformer having a full wave rectifier associated therewith. On the output side of the transformer 8, the connections means 4 is provided which makes electrical contact with a continuous water flow from a water pump or pneumatic water pressure system independent of the common water supply.

As can readily be appreciated by those skilled in the art, and particularly as can be understood from the previous description, the efficacy if the exterminating technique of the instant invention is based upon the well known principle that when a continuous flow of water is connected to the negative and positive poles of an electric power supply, any living body that is in contact between the poles, with the continuous water flow, suffers an electrical discharge therethrough, whereas trees and plants would not be adversely effected thereby due to their connection to the ground or negative pole via their roots. Water is the best conductor to the bark or leaves of the tree or plant. By controlling the different characteristics of the electric current, the adverse affects thereof can be suitably controlled such that only insects or animals will be destroyed or have their nervous system paralyzed. An intermittent utilization of the flow of water with the electrical discharge therethrough will be such as to prevent such pests which will be destroyed or have their nervous system paralyzed. An intermittent utilization of the flow of water with the electrical discharge therethrough will be such as to prevent such pests from resting on the trees, plants, or crops. Of course, as described, the characteristics of the electric current can be changed depending upon the different types, classes, and/or size of the pests. The apparatus necessary to bring into fruition the exterminating method of the instant invention are all well-known.

As a specific example; if there is applied between two separate plates at a distance between each other of 100mm., a voltage or potential difference of 100 volts for each millimeter exists between these two plates. This corresponds to a difference of potential of 1 volt per millimeter and if an insect placed between these two plates measures 5 milimeters and it has an electric resistance of 1 ohm, it will receive an electric discharge equivalent to 5mm. or 5 volts. If the insect requires for its extermination a difference of potential of 50 volts, then the voltage applied between the positive pole and the negative pole should be 1,000 volts.

It should be appreciated that the amperage is what actually kills and the potential, i.e., the power applied, will depend on the surface of the agricultural area to be treated and also on the class and type of the different insects and animals to be killed with different electric resistance. For example, supposing that an insect has a resistence of 10,000 ohms and that, after laboratory studies, it dies with a current intensity of one ampere, the voltage applied and necessary for his death will be:

$$V - RI$$

$$V - 10,000 \text{ volts.}$$

With Direct electric current. Supposing a voltage drop of 5,000 volts through the water conducting flow, then there should be applied for this insect or animal a flow of 15,000 volts at the outlet of the hose which provides this water flow Consequently the insect gets into contact with 10,000 volts, the power being $$W = RI^2 = VI$$

For this sepcific case wherein the value of $V$ equals 15,000 volts, the value of $I$ equals one ampere; for the case of the continous or direct current, the applied power will be 15,000 watts for a relatively short time.

Throughout the specification mention has been made to controlling the combination of the power, the voltage or tension and the amperage regarding direct current. In relation to alternating current, the combination will comprise voltage, amperage, power, frequency, reactancy i.e. inductive reactance, capacitive resistence and electric resistivity of the trees and of the insects and/or animals.

It should be apparent from the foregoing detailed description that the objects set forth hereinabove have been successfully achieved. Moreover, while there is shown and described present preferred embodiments of the invention, it is to be distinctly understood that the invention is not limited thereto but may be otherwise variously embodied and practiced within the scope of the following claims. Accordingly

What is claimed is:

1. A method of exterminating insects and animal pests comprising the steps of providing a source of electricity having positive and negative poles, controlling the electrical parameters of the source, providing a continuous flow of water through at least one of said poles, and completing an electrical circuit between the poles by the continuous flow of water which is directed to make contact with the pests, to effect an electric discharge through the pests.

2. A method for exterminating insect and animal agricultural pests from objects such as plants infected thereby, said method comprising the steps of connecting one pole of an electric source to a rod of plate of good electric conductive material, and burying the rod adjacent to the root of the infected plant, coupling the other pole of the electric source to the exit of a water pressure system and irrigating with a continuous flow from the water pressure system with angular movement over the infected plant, to effect a discharge of electricity through the water and plant between the poles of the electric source, whereby the pests are electrified and eliminated.

3. An exterminating method as defined in claim 2, wherein at least one positive pole of the electric source is coupled to a separate hose having an electrical conductive portion therein, in contact with the water supply, and coupled with the water system, and wherein the rod is connected with the negative pole.

4. A method as defined in claim 2, further comprising the steps of also connecting the positive pole of the electric source to a rod or plate buried near the root, and connecting the negative pole of the source to a rod or plate buried in the opposite side of the root of the plant, the area between the rods or plates having been previously irrigated until the root is wet.

5. A method as defined in claim 4, wherein the negative pole of the electric source is further connected to electrical conductors disposed at various locations on the infected object in order to obtain a better negative circuit, and wherein electric insulated pipes are used to effect contact of the continuous flow of water with the positive pole, effecting universal movement of the pipes so that the water touches the trees or plants, thereby effecting a discharge of electricity through the trees or plants.

6. A method as defined in claim 2 further including the step of inserting additives into the water supply to increase the electrical conductivity thereof.

7. A method as defined in claim 2 wherein a plurality of separate continuous flows of water are provided each continuous flow being directed over the entire plant, each flow being respectively connected to a different pole of the electric continuous source.

* * * * *